(12) United States Patent
Jia et al.

(10) Patent No.: US 12,211,314 B2
(45) Date of Patent: Jan. 28, 2025

(54) CONTROL METHOD, ELECTRONIC DEVICE, AND STORAGE MEDIUM FOR FACIAL AND GESTURE RECOGNITION

(71) Applicant: BOE Technology Group Co., Ltd., Beijing (CN)

(72) Inventors: Honghong Jia, Beijing (CN); Fengshuo Hu, Beijing (CN); Jingru Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 515 days.

(21) Appl. No.: 17/610,148

(22) PCT Filed: Jan. 26, 2021

(86) PCT No.: PCT/CN2021/073713
§ 371 (c)(1),
(2) Date: Nov. 9, 2021

(87) PCT Pub. No.: WO2022/160085
PCT Pub. Date: Aug. 4, 2022

(65) Prior Publication Data
US 2023/0252821 A1 Aug. 10, 2023

(51) Int. Cl.
*G06V 40/16* (2022.01)
*G06V 10/75* (2022.01)
(Continued)

(52) U.S. Cl.
CPC .......... *G06V 40/172* (2022.01); *G06V 10/751* (2022.01); *G06V 10/7715* (2022.01); *G06V 40/20* (2022.01)

(58) Field of Classification Search
CPC .............. G06V 40/172; G06V 10/751; G06V 10/7715; G06V 40/20; G06V 40/28;
(Continued)

(56) References Cited

U.S. PATENT DOCUMENTS 7,274,803 B1 * 9/2007 Sharma ................ G06V 40/107
382/128
8,929,612 B2 * 1/2015 Ambrus ............... G06V 40/107
382/115
(Continued)

FOREIGN PATENT DOCUMENTS

CN 102081918 A * 6/2011
CN 102456135 A * 5/2012 ............. G06F 3/017
(Continued)

OTHER PUBLICATIONS

English translation of CN 111901681 A, Intelligent Television Control Device and Method Based on Face Recognition and Gesture Recognition (Year: 2020).*
(Continued)

*Primary Examiner* — Manav Seth
(74) *Attorney, Agent, or Firm* — Ling Wu; Stephen Yang; Ling and Yang Intellectual Property

(57) ABSTRACT

Provided is a control method including obtaining a first image; performing face recognition and gesture recognition on the first image; turning on a gesture control function when a first target face is recognized from the first image and a first target gesture is recognized from the first image; and returning to the act of obtaining the first image when the first target face is not recognized from the first image or the first target gesture is not recognized from the first image.

19 Claims, 5 Drawing Sheets

(51) Int. Cl.
*G06V 10/77* (2022.01)
*G06V 40/20* (2022.01)

(58) Field of Classification Search
CPC ........ G06V 40/16; G06V 40/00; G06V 40/10; G06V 40/173; G06V 40/11; G06V 40/113; G06V 10/10; G06V 10/70; G06V 10/96; G06V 10/20
See application file for complete search history.

(56) References Cited

U.S. PATENT DOCUMENTS

| | | | | |
|---|---|---|---|---|
| 9,152,853 | B2* | 10/2015 | El Dokor | G06V 40/113 |
| 9,165,181 | B2* | 10/2015 | Maeda | G06V 40/20 |
| 9,569,005 | B2* | 2/2017 | Ahmed | G06F 3/0304 |
| 9,652,042 | B2* | 5/2017 | Wilson | G06F 3/017 |
| 9,684,372 | B2* | 6/2017 | Xun | G06F 3/012 |
| 9,891,716 | B2* | 2/2018 | El Dokor | G06V 40/10 |
| 9,940,507 | B2* | 4/2018 | Maeda | G06V 20/46 |
| 2001/0053292 | A1* | 12/2001 | Nakamura | G06T 7/73 |
| | | | | 707/E17.02 |
| 2006/0029277 | A1* | 2/2006 | Funayama | G06V 40/20 |
| | | | | 382/118 |
| 2006/0291001 | A1* | 12/2006 | Sung | G06V 40/171 |
| | | | | 358/448 |
| 2007/0057966 | A1* | 3/2007 | Ohno | G06V 40/16 |
| | | | | 707/E17.031 |
| 2009/0279786 | A1* | 11/2009 | Kasugai | G06V 40/165 |
| | | | | 382/195 |
| 2012/0114255 | A1* | 5/2012 | Kimura | G06V 40/161 |
| | | | | 382/203 |
| 2013/0088426 | A1* | 4/2013 | Shigeta | G06F 3/0304 |
| | | | | 345/156 |
| 2014/0062862 | A1* | 3/2014 | Yamashita | G06V 40/174 |
| | | | | 382/103 |
| 2019/0341050 | A1* | 11/2019 | Diamant | G06V 40/172 |
| 2020/0183556 | A1* | 6/2020 | Liu | G06V 40/28 |
| 2020/0272717 | A1 | 8/2020 | Figueredo de Santana et al. | |
| 2021/0216145 | A1* | 7/2021 | Monge Nunez | G06V 40/172 |
| 2022/0198836 | A1* | 6/2022 | Wu | G06V 40/107 |
| 2023/0027040 | A1* | 1/2023 | Wang | G06V 10/809 |

FOREIGN PATENT DOCUMENTS

| | | | | |
|---|---|---|---|---|
| CN | 102799855 | A | | 11/2012 |
| CN | 106648079 | A * | 5/2017 | .......... G06F 18/2411 |
| CN | 108032836 | A | | 5/2018 |
| CN | 108108649 | A * | 6/2018 | .......... G06V 40/172 |
| CN | 109269041 | A | | 1/2019 |
| CN | 109862067 | A | | 6/2019 |
| CN | 111901681 | A * | 11/2020 | ....... H04N 21/42221 |
| JP | 2012098988 | A * | 5/2012 | ............. G06F 3/017 |

OTHER PUBLICATIONS

English translation of CN 108108649 A, Identity Authentication Method and Device (Year: 2018).*
English translation of CN 106648079 A, A Television Entertainment System Based on Face Recognition and Gesture Interaction (Year: 2017).*
Bo Sun et al., "Emotion Analysis Based on Facial Expression Recognition in Smart Learning Environment", Modern Distance Education Research, pp. 96-103, vol. 2, 2015.
Yo-Jen Tu et al., "Human Computer Interaction Using Face and Gesture Recognition".

* cited by examiner

CONTROL METHOD, ELECTRONIC DEVICE, AND STORAGE MEDIUM FOR FACIAL AND GESTURE RECOGNITION

CROSS-REFERENCE TO RELATED APPLICATION

The present application is a U.S. National Phase Entry of International Application No. PCT/CN2021/073713 having an international filing date of Jan. 26, 2021, the entire content of which is hereby incorporated by reference.

TECHNICAL FIELD

The present disclosure relates to, but is not limited to, the field of Human-Computer Interaction technologies, in particular to a control method, an electronic device, and a storage medium.

BACKGROUND

With continuous development of sciences and technologies, computers will be more and more widely used in many fields. Human-Computer Interaction is a main path for computers to read and understand information from human. One of key points in smart device technologies is how to achieve human-computer interaction more conveniently and effectively.

SUMMARY

Following is a summary about the subject matter described in the present disclosure in detail. The summary is not intended to limit the protection scope of claims.

An embodiment of the present disclosure provides a control method, an electronic device, and a storage medium.

In one aspect, an embodiment of the present disclosure provides a control method, which includes: obtaining a first image; performing face recognition and gesture recognition on the first image; turning on a gesture control function when a first target face is recognized from the first image and a first target gesture is recognized from the first image; and returning to the act of obtaining the first image when the first target face is not recognized from the first image or the first target gesture is not recognized from the first image.

In some exemplary embodiments, the above control method further includes providing first prompt information on a display interface when the first target face is recognized from the first image and the first target gesture is recognized from the first image, wherein the first prompt information is used for prompting a user that the gesture control function has been turned on.

In some exemplary embodiments, the above control method further includes providing second prompt information on a display interface when the first target face is recognized from the first image and the first target gesture is not recognized from the first image, wherein the second prompt information is used for prompting a user to adjust a gesture.

In some exemplary embodiments, the above control method further includes providing third prompt information on a display interface when the first target face is not recognized from the first image, wherein the third prompt information is used for prompting a user to adjust an angle of a face facing an acquisition device.

In some exemplary embodiments, the above control method further includes providing fourth prompt information on the display interface when the first target face is still not recognized from a first image of another frame re-acquired after the third prompt information is provided, wherein the fourth prompt information is used for prompting that the user has no operation authority.

In some exemplary embodiments, the above control method further includes obtaining a second image after the gesture control function is turned on, and performing face recognition and gesture recognition on the second image; and turning on a function corresponding to a second target gesture when a second target face is recognized from the second image and the second target gesture is recognized from the second image.

In some exemplary embodiments, the above control method further includes returning to the act of obtaining the second image when the second target face is not recognized from the second image or the second target gesture is not recognized from the second image; and turning off the gesture control function when the second target face is not recognized from second images of consecutive multiple frames within a set time period.

In some exemplary embodiments, the performing face recognition and gesture recognition on the first image includes: performing face recognition on the first image; and performing gesture recognition on the first image after the first target face is recognized from the first image.

In some exemplary embodiments, the performing face recognition on the first image includes: detecting whether the first image includes a face; detecting whether the face in the first image is occluded when it is detected that the first image includes the face; detecting whether the face in the first image is a front face when it is detected that the face in the first image is not occluded; performing feature extraction on the first image to obtain face data to be recognized when it is detected that the face in the first image is the front face; comparing the face data to be recognized with target face data in a face database; returning a result that the first target face is recognized from the first image when there is target face data matched with the face data to be recognized in the face database; and returning a result that the first target face is not recognized from the first image when it is detected that the first image does not include a face, or that the face in the first image is occluded, or that the face in the first image is not a front face, or that there is no target face data matched with the face data to be recognized in the face database.

In some exemplary embodiments, the above control method further includes registering a target face in the face database; wherein the registering the target face in the face database includes: obtaining a registered image; detecting whether the registered image includes a face; returning to the act of obtaining the registered image when it is detected that the registered image does not include a face; detecting whether the face in the registered image is occluded when it is detected that the registered image includes the face; returning to the act of obtaining the registered image when it is detected that the face in the registered image is occluded; detecting whether the face in the registered image is a front face when it is detected that the face in the registered image is not occluded; returning to the act of obtaining the registered image when it is detected that the face in the registered image is not a front face; performing feature extraction on the registered image to obtain face data to be registered when it is detected that the face in the registered image is a front face; comparing the face data to be registered with registered face data in the face database; providing fifth prompt information on a display interface when there is registered face data matched with the face data to be registered in the face database, wherein the fifth prompt information is used for prompting that a user is already registered; and assigning an identifier to the face data to be registered when there is no registered face data matched with the face data to be registered in the face database, and saving the face data to be registered in the face database.

In some exemplary embodiments, the performing gesture recognition on the first image includes: detecting whether the first image includes a human body; segmenting the human body to obtain a plurality of segmented regions when it is detected that the first image includes the human body, and detecting whether the segmented regions include an arm region; detecting whether the arm region includes a hand region when it is detected that the segmented regions include the arm region; performing gesture recognition on the hand region when it is detected that the arm region includes the hand region; returning a result that the first target gesture is recognized from the first image when a gesture in the hand region is recognized as the first target gesture; and returning a result that the first target gesture is not recognized from the first image when it is detected that the first image does not include a human body, or that the segmented regions do not include an arm region, or that the arm region does not include a hand region, or that the gesture in the hand region is not the first target gesture.

In some exemplary embodiments, the first target gesture includes an OK gesture.

In some exemplary embodiments, the turning on the function corresponding to the second target gesture includes: determining a mapping position of a palm of one hand on a display interface when the second target gesture is the palm of one hand, and selecting an icon corresponding to the mapping position; and turning on a function indicated by the icon corresponding to the mapping position after the palm of one hand is detected and when it is detected that the second target gesture is a fist of one hand.

In another aspect, an embodiment of the present disclosure further provides an electronic device, which includes a display, a processor, and a memory. The display is connected to the processor and is adapted to provide a display interface, and the memory is adapted to store a computer program, and when the computer program is executed by the processor, acts of the aforementioned control method are implemented.

In another aspect, an embodiment of the present disclosure further provides a computer-readable storage medium storing a computer program, wherein when the computer program is executed by a processor; acts of the above control method are implemented.

After the drawings and the detailed descriptions are read and understood, the other aspects may be comprehended.

BRIEF DESCRIPTION OF DRAWINGS

Accompanying drawings are used to provide a further understanding of technical solutions of the present disclosure and constitute a part of the specification to explain the technical solutions of the present disclosure together with embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
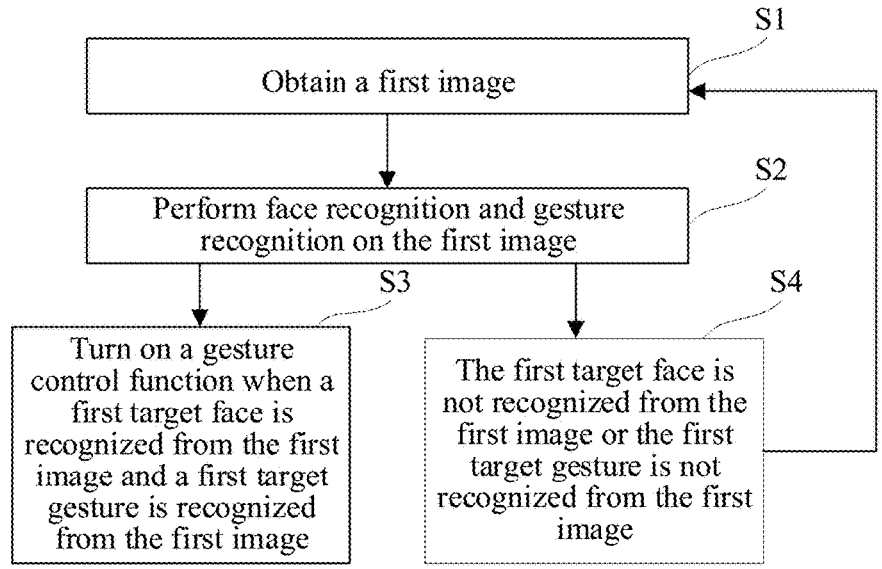
FIG. 1 is a flowchart of a control method according to at least one embodiment of the present disclosure.

Hereinafter embodiments of the present disclosure will be described in detail with reference to the accompanying drawings. The embodiments may be implemented in a plurality of different forms. Those of ordinary skills in the art will readily understand a fact that implementations and contents may be transformed into one or more of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of one or more constituent elements, or a thickness or a region of a layer, is sometimes exaggerated for clarity. Therefore, an embodiment of the present disclosure is not necessarily limited to the size, and shapes and sizes of a plurality of components in the drawings do not reflect real scales. In addition, the drawings schematically show ideal examples, and an implementation of the present disclosure is not limited to the shapes or values shown in the drawings.

The "first", "second", "third" and other ordinal numbers in the present disclosure are used to avoid confusion of constituent elements, not to provide any quantitative limitation. In the present disclosure, "plurality" means two or more in quantity.

In the present disclosure, for the sake of convenience, wordings such as "central", "upper", "lower", "front", "rear", "vertical", "horizontal", "top", "bottom", "inner", "outer" and the others describing the orientations or positional relations are used to depict positional relations of constituent elements with reference to the drawings, which are only convenient for describing the specification and simplifying description, rather than for indicating or implying that the apparatus or element referred to must have a specific orientation, or must be constructed and operated in a particular orientation, and therefore, those wordings cannot be construed as limitations on the present disclosure. The positional relations of the constituent elements may be appropriately changed according to a direction in which constituent elements are described. Therefore, the wordings are not limited in the specification, and may be replaced appropriately according to a situation.

In the present disclosure, the terms "installed", "connected", and "coupled" shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand meanings of the above terms in the present disclosure according to a situation.

Nowadays, large-sized display devices (for example, 98-inch and 110-inch display devices) are usually used in exhibition halls, outdoor plazas and other scenes. When a large-size display device is not equipped with a touch-control function, a function of the display apparatus usually needs to be controlled through a hardware device such as a remote controller. However, the remote controller and other hardware devices generally do not have a recognition function, and can be used by anyone, which will cause a lot of inconvenience and security problems.

Embodiments of the present disclosure provide a control method and an electronic device, which support a user to control an electronic device in the air, may alleviate dependence of the user on hardware devices such as a remote controller, and may save a cost of electronic device and improve user experience.

FIG. 1 is a flowchart of a control method according to at least one embodiment of the present disclosure. As shown in FIG. 1, the control method provided by this exemplary embodiment includes the following acts S1-S4.

Act S1, obtaining a first image.

Act S2, performing face recognition and gesture recognition on the first image.

Act S3, turning on a gesture control function when a first target face is recognized from the first image and a first target gesture is recognized from the first image.

Act S4, returning to the act of obtaining a first image, that is, returning to the act S1, when the first target face or the first target gesture is not recognized from the first image. After returning to the act S1, a first image of another frame may be obtained to continue face recognition and gesture recognition.

In this exemplary embodiment, the first target face being recognized from the first image indicates that face recognition of the first image is successful, and the first target gesture being recognized from the first image indicates that gesture recognition of the first image is successful. The first target face not being recognized from the first image indicates that face recognition of the first image fails, and the first target gesture not being recognized from the first image indicates that gesture recognition of the first image fails.

In some exemplary embodiments, the control method according to this embodiment may be performed by an electronic device having a display interface. For example, the electronic device may be a large-sized display device, a smart TV, and the like. However, this embodiment is not limited thereto.

In some exemplary embodiments, obtaining the first image may include obtaining the first image acquired through an acquisition device. In some examples, the acquisition device may be a camera. For example, the camera may take a real-time image of a scene facing the electronic device. For a first image acquired through the acquisition device in real time, after the first target face and the first target gesture are not recognized from a first image of one frame, face recognition and gesture recognition may be performed for a first image of another frame acquired in real time. However, this embodiment is not limited thereto. In some examples, an image acquired through an acquisition device and preprocessed may be obtained.

In some exemplary embodiments, the acquisition device may be integrated in the electronic device, or may be connected to the electronic device by a wired or wireless manner to achieve information interaction with the electronic device. However, this embodiment is not limited thereto.

In some exemplary embodiments, the electronic device may perform the control method according to this embodiment after being started; or, the electronic device performs the control method according to this embodiment after the acquisition device is started. However, a trigger mode of the control method is not limited in this embodiment.

In some exemplary embodiments, the first target face being not recognized from the first image may include at least one of the following situations: no face is detected from the first image, and a face recognized from the first image is not the first target face. The first target gesture being not recognized from the first image may include at least one of the following situations: no hand region is detected from the first image, and a gesture recognized from the first image is not the first target gesture. However, this embodiment is not limited thereto.

In some exemplary embodiments, the first target face may include a face registered in a face database, or a face registered in a face database and set as an administrator. However, this embodiment is not limited thereto.

In some exemplary embodiments, the first target gesture may include an OK gesture. However, this embodiment is not limited thereto. For example, the first target gesture may include a V-shaped gesture, or a gesture of number 8. Or, in some examples, the first target gesture may be formed by a gesture combined of two hands, for example, a love gesture.

In some exemplary embodiments, once the gesture control function is turned on, a registered user may use a second target gesture to control the electronic device. For example, content may be displayed on a display interface of the electronic device in response to a recognized second target gesture of the registered user, or the electronic device may be controlled to play a corresponding audio or video file. The second target gesture may be different from the first target gesture. For example, the second target gesture may include at least one of the following: a palm of one hand and a fist of one hand. However, this embodiment is not limited thereto. In some examples, the second target gesture may be formed by a gesture combined of two hands, for example, a pause gesture.

According to the control method provided by this exemplary embodiment, whether to turn on the gesture control function is determined based on dual recognition results of face recognition and gesture recognition. When both face recognition and gesture recognition are successful, the gesture control function may be turned on, so that a target user may achieve long-distance, non-contact control the electronic device, and chaos that exist when a plurality of people use gestures to manipulate the electronic device may be avoided. In some application scenarios (e.g., exhibition halls), dependence of a user on a hardware device such as a remote controller may be alleviated. In addition, based on the control method of this embodiment, the electronic device does not require a touch-control function, which saves the cost of the electronic device and improves the user experience.

In some exemplary embodiments, the control method according to this embodiment further include: providing first prompt information on a display interface when a first target face and a first target gesture are recognized from a first image, wherein the first prompt information is used for prompting a user that a gesture control function has been turned on. In some examples, the first prompt information may include the following: the gesture control function has been turned on. However, this embodiment is not limited thereto. For example, the electronic device may provide the first prompt information to the user through audio.

In some exemplary embodiments, the control method according to this embodiment further include: providing second prompt information on a display interface when a first target face is recognized from a first image and a first target gesture is not recognized from the first image, wherein the second prompt information is used for prompting a user to adjust a gesture. In some examples, the first target gesture is an OK gesture, and the second prompt information may include the following content: Please make an OK gesture to turn on the gesture control function. However, this embodiment is not limited thereto. For example, the electronic device may provide the second prompt information to the user through audio.

In some exemplary embodiments, the control method according to this embodiment further include: providing third prompt information on a display interface when a first target face is not recognized from a first image, wherein the third prompt information is used for prompting a user to adjust an angle of a face facing an acquisition device. In some examples, the third prompt information may include the following content: Please face a camera for recognition. However, this embodiment is not limited thereto. For example, the electronic device may provide the third prompt information to the user through audio.

In some exemplary embodiments, the control method according to this embodiment further include: providing fourth prompt information on a display interface when a first target face is still not recognized from a first image of another frame re-acquired after the third prompt information is provided, wherein the fourth prompt information is used for prompting that a user has no operation authority. In some examples, after reminding the user to adjust the angle of the face facing the acquisition device through the third prompt information, if face recognition for the re-acquired first image still fails, the fourth prompt information may be displayed on the display interface of the electronic device. For example, the fourth prompt information may include the following content: You do not have operation authority, please contact the administrator. However, this embodiment is not limited thereto. For example, the electronic device may provide the fourth prompt information to the user through audio.

In the above exemplary embodiments, the user may be provided with targeted prompt information based on recognition results of face recognition and gesture recognition, so that the user may know the recognition results of face and gesture and adaptively adjust a face position or a gesture, which is conducive to improving the user experience.

In some exemplary embodiments, the control method according to this embodiment further include: obtaining a second image after the gesture control function is turned on, and performing face recognition and gesture recognition on the second image; and turning on a function corresponding to a second target gesture when a second target face and the second target gesture are recognized from the second image. In this exemplary embodiment, the second image is an image obtained after the gesture control function is turned on. For example, the second image is an image acquired through the acquisition device in real time after the gesture control function is turned on, or an image obtained by preprocessing the image acquired through the acquisition device in real time after the gesture control function is turned on. After the gesture control function is turned on, the function corresponding to the second target gesture of the second target face may be performed. For example, an operation icon on the display interface of the electronic device is selected in response to the second target gesture of the second target face. However, this embodiment is not limited thereto.

In some exemplary embodiments, the second target face recognized from the second image is consistent with the first target face recognized from the first image, that is, a same registered user controls the electronic device with gestures after turning on the gesture control function. Or, in some examples, the second target face may be inconsistent with the first target face, that is, one registered user turns on the gesture control function, and then another registered user controls the electronic device with gestures. However, this embodiment is not limited thereto.

In some exemplary embodiments, the control method according to this embodiment further include: returning to the act of obtaining the second image when the second target face is not recognized from the second image or the second target gesture is not recognized from the second image; and turning off the gesture control function when the second target face is not recognized from second images of consecutive multiple frames within a set time period. In some examples, the set time period may be 5 seconds. In this exemplary embodiment, whether to turn off the gesture control function is determined according to face recognition results of multi-frame second images within a set time period. However, this embodiment is not limited thereto. For example, when both face recognition and gesture recognition of the second image fail, the gesture control function may be turned off.

In some exemplary embodiments, the control method according to this embodiment further include: third prompt information may be provided on the display interface when the second target face is not recognized from the second image, wherein the third prompt information is used for prompting a user to adjust an angle of a face facing the acquisition device; and sixth prompt information for prompting the user to adjust a gesture may be provided on the display interface when the second target face is recognized from the second image and a second target gesture is not recognized from the second image. For example, the sixth prompt information may include the following content: Please make a registered gesture to activate a corresponding function. However, this embodiment is not limited thereto.

In some exemplary embodiments, performing face recognition and gesture recognition on the first image includes: performing face recognition on the first image; and performing gesture recognition on the first image after the first target face is recognized from the first image. In this exemplary embodiment, face recognition and gesture recognition are performed on the first image in sequence, and gesture recognition is performed only after face recognition is successful, which may save processing resources. However, this embodiment is not limited thereto. In some examples, face recognition and gesture recognition may be performed on the first image simultaneously. Or, gesture recognition may be performed on the first image before face recognition.

In some exemplary embodiments, performing face recognition on the first image includes: detecting whether the first image includes a face; detecting whether the face in the first image is occluded when it is detected that the first image includes a face; detecting whether the face in the first image is a front face when it is detected that the face in the first image is not occluded; performing feature extraction on the first image to obtain face data to be recognized when it is detected that the face in the first image is the front face; comparing the face data to be recognized with target face data in a face database; returning a result that the first target face is recognized from the first image when there is target face data matched with the face data to be recognized in the face database; and returning a result that the first target face is not recognized from the first image when it is detected that the first image does not include a face, or that the face in the first image is occluded, or that the face in the first image is not a front face, or that there is no target face data matched with the face data to be recognized in the face database. In this exemplary embodiment, face recognition is achieved by sequentially performing face detection, occlusion detection, posture detection, feature extraction, and comparison on the first image.

In some exemplary embodiments, the control method according to this embodiment further include: registering a target face in a face database; In some examples, registering the target face in the face database includes: obtaining a registered image; detecting whether the registered image includes a face; returning to the act of obtaining a registered image when it is detected that the registered image does not include a face; detecting whether the face in the registered image is occluded when it is detected that the registered image includes a face; returning to the act of obtaining a registered image when it is detected that the face in the registered image is occluded; detecting whether the face in the registered image is a front face when it is detected that the face in the registered image is not occluded; returning to the act of obtaining a registered image when it is detected that the face in the registered image is not a front face; performing feature extraction on the registered image to obtain face data to be registered when it is detected that the face in the registered image is a front face; comparing the face data to be registered with already registered face data in the face database; providing fifth prompt information on a display interface when there is registered face data matched with the face data to be registered in the face database, wherein the fifth prompt information is used for prompting that the user is already registered; and assigning an identifier to the face data to be registered when there is no registered face data matched with the face data to be registered in the face database, and saving the face data to be registered in the face database. In this exemplary embodiment, face registration is achieved by sequentially performing face detection, occlusion detection, posture detection, feature extraction, and comparison on the registered image.

In some exemplary embodiments, performing gesture recognition on the first image includes: detecting whether the first image includes a human body; segmenting the human body to obtain a plurality of segmented regions when it is detected that the first image includes the human body, and detecting whether the segmented regions include an arm region; detecting whether the arm region includes a hand region when it is detected that the segmented regions include an arm region; performing gesture recognition on the hand region when it is detected that the arm region includes a hand region; returning a result that the first target gesture is recognized from the first image when a gesture in the hand region is recognized as the first target gesture; and returning a result that the first target gesture is not recognized from the first image when it is detected that the first image does not include a human body, or that the segmented regions do not include an arm region, or that the arm region does not include a hand region, or that the gesture in the hand region is not the first target gesture. In this exemplary embodiment, a success rate of gesture detection may be improved by performing human body detection, human body segmentation, arm region detection, and hand region detection on the first image in sequence, and performing gesture recognition in the hand region.

In some exemplary embodiments, turning on a function corresponding to the second target gesture includes: determining a mapping position of a palm of one hand on the display interface when the second target gesture is the palm of one hand, and selecting an icon corresponding to the mapping position; and turning on a function indicated by the icon corresponding to the mapping position after the palm of one hand is detected and when it is detected the second target gesture is a fist of one hand. In some examples, after a registered user's palm of one hand is detected, an icon (e.g., a file icon) corresponding to a mapping position is illuminated by using the mapping position of the palm of one hand on the display interface, and then a file corresponding to the icon may be controlled to open after the registered user's fist of one hand is detected. However, this embodiment is not limited thereto. In some examples, registered users may preset a correspondence between gestures and control operations according to their respective usage habits or needs. After the second target gesture is recognized, a control operation corresponding to the recognized second target gesture may be performed according to a preset correspondence.

The control method according to this embodiment will be illustrated by some examples below.

Figure 2:
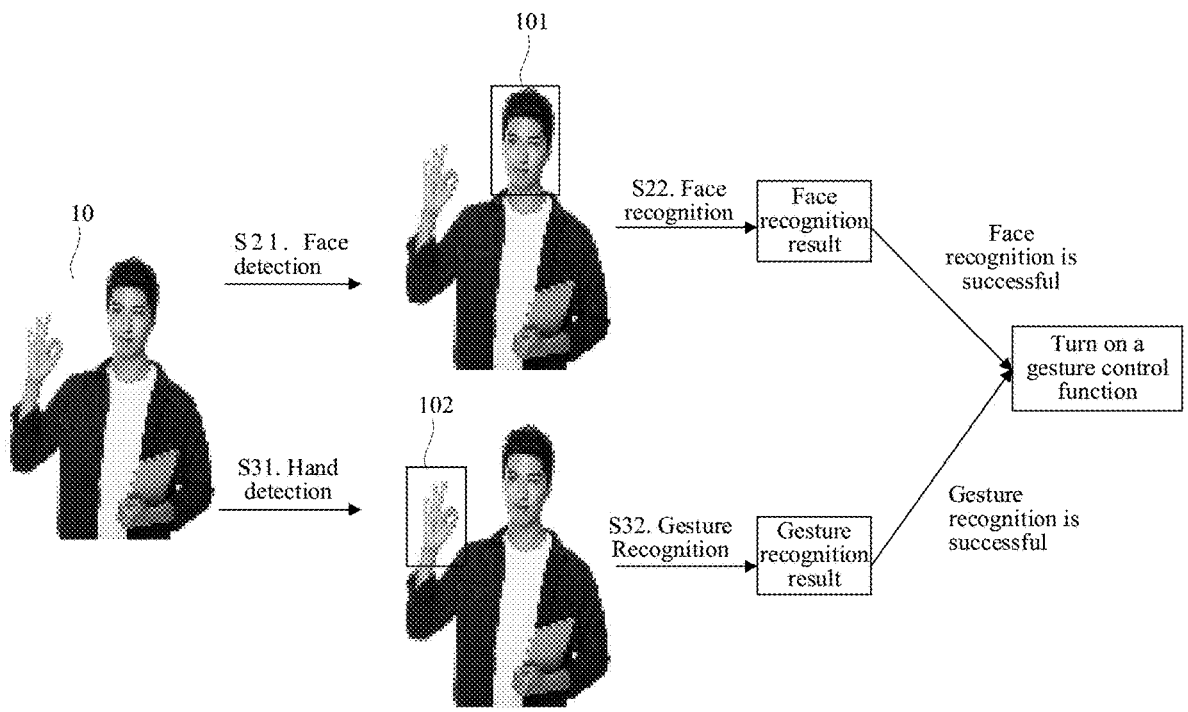
FIG. 2 is an exemplary flowchart of a control method according to at least one embodiment of the present disclosure.

FIG. 2 is an exemplary flowchart of a control method according to at least one embodiment of the present disclosure. In some exemplary embodiments, after obtaining a first image, face recognition may be performed on the first image by using a face model to obtain a face recognition result, and gesture recognition may be performed on the first image by using a gesture model to obtain a gesture recognition result. According to the results of face recognition and gesture recognition, it is then determined whether to turn on a gesture control function. In some examples, the first image may be acquired through an acquisition device in real time. In some examples, the face model may include a face detection model and a face recognition model. The face detection model is configured to be used to detect a face region from the first image, and the face recognition model is configured to be used to perform face recognition on the face region. The gesture model may include a hand detection model and a gesture recognition model. The hand detection model is configured to be used to detect a hand region from the first image, and the gesture recognition model is configured to be used to perform gesture recognition on the hand region. However, this embodiment is not limited thereto.

As shown in FIG. 2, the control method according to this exemplary embodiment includes the following acts.

Act S20, obtaining a first image. For example, a first image 10 may be obtained, through an acquisition device.

Act S21, performing face detection on the first image by using a face detection model. In some examples, when the first image 10 includes a face, a face region 101 may be detected in the first image 10 by using a face detection model; when no face is detected by using the face detection model, returning a result that face recognition on the first image fails. In some examples, the face region 101 is a rectangular frame region where a face is located. However, this embodiment is not limited thereto.

Act S22, performing face recognition on the face region 101 by using a face recognition model to obtain a face recognition result. In some examples, a face recognition result is that a first target face is recognized in the first image, that is, face recognition is successful; or, the face recognition result is that face recognition fails.

Act S31, performing hand detection on the first image by using a hand detection model. In some examples, when the first image 10 includes a hand, a hand region 102 may be detected in the first image 10 by using a hand detection model; when no hand is detected in the first image by using the hand detection model, returning a result that hand recognition on the first image fails. In some examples, the hand region 102 may be a rectangular frame region where a hand is located. However, this embodiment is not limited thereto.

Act S32, performing gesture recognition on the hand region 102 by using a gesture recognition model to obtain a gesture recognition result. In some examples, a gesture recognition result may be that a first target gesture (for example, an OK gesture) is recognized in the first image, that is, gesture recognition is successful; or, the gesture recognition result is that gesture recognition fails.

In some exemplary embodiments, when the gesture recognition result is that gesture recognition is successful and the face recognition result is that face recognition is successful, the gesture control function is turned on. In a case that gesture recognition fails or face recognition fails, a first image of a next frame may be obtained for face and gesture recognition again. For example, a first image of a next frame acquired through the acquisition device is obtained for face recognition and gesture recognition again.

In some exemplary embodiments, the face detection model is only responsible for detecting a face region from a first image, and the hand detection model is only responsible for detecting a hand region from the first image. The face detection model and the hand detection model may be trained separately to achieve different functions. In some examples, the face detection model may be an SSD detection model, and the hand detection model may be a mobile-NetV1-ssd model. However, this embodiment is not limited thereto.

In some exemplary embodiments, a resnet50 network architecture may be used for the face recognition model, and a mobileNetV2 network architecture may be used for the gesture recognition model. However, this embodiment is not limited thereto.

In some exemplary embodiments, the face recognition model may be used to identify whether a first target face is included in a first image based on a face database. In some examples, the face recognition model may include an occlusion detection module, a posture detection module, a feature extraction module, and a comparison module. The occlusion detection module is configured to be used to detect whether a face in a face region is occluded. The gesture detection module is configured to be used to detect whether a face in a face region is a front face or not. The feature extraction module is configured to be used to perform feature extraction on a face region. The comparison module is configured to be used to compare face data obtained by the feature extraction module with face data in a face database, and determine whether a target face is recognized according to a comparison result.

Figure 3:
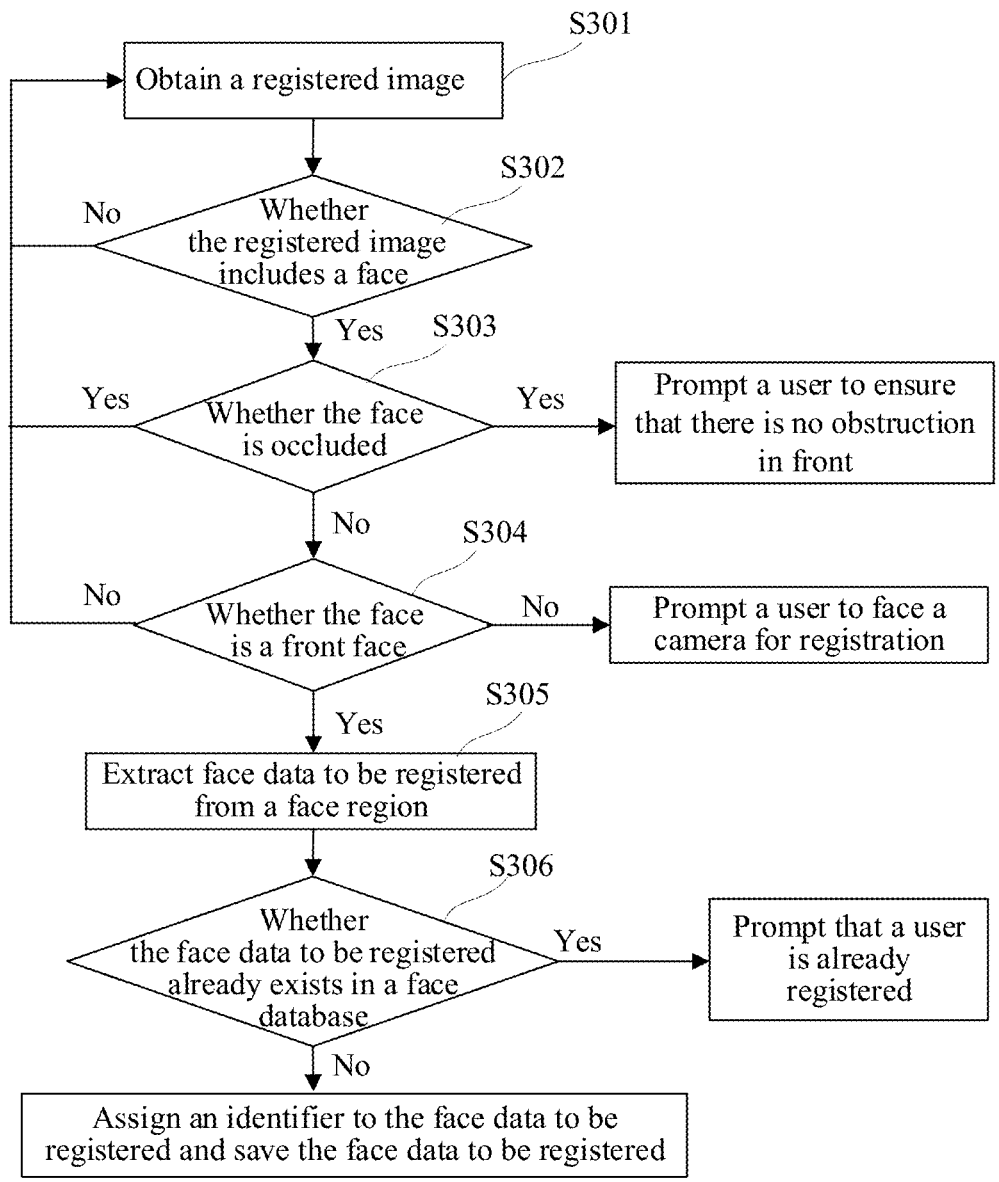
FIG. 3 is an exemplary flowchart of a face registration process according to at least one embodiment of the present disclosure.

FIG. 3 is an exemplary flowchart of a face registration process according to at least one embodiment of the present disclosure. In some examples, the electronic device may be controlled to enter the face registration process by triggering a registration button provided on the electronic device or a registration icon displayed on the display interface. However, this embodiment is not limited thereto.

As shown in FIG. 3, the face registration process of this exemplary embodiment includes the following acts.

Act S310, obtaining a registered image. For example, a registered image acquired through an acquisition device in real time may be acquired.

Act S302, detecting whether the registered image includes a face region by using a face detection model. In some examples, when a face region is detected in a registered image by using a face detection model, act S303 is performed; when no face region is detected in the registered image by using the face detection model, the process returns to the act S301, that is, a registered image of a next frame is obtained for processing.

Act S303, detecting whether a face in the face region is occluded by using an occlusion detection module. In some examples, when it is detected that a face in the face region is not occluded, act S304 is performed; when it is detected that the face in the face region is occluded, the process returns to the act S301, that is, a registered image of a next frame is obtained for processing, and a user is prompted to ensure that there is no occlusive object in front.

Act S304, detecting whether the face in the face region is a front face by using a posture detection module. In some examples, when it is detected that the face in the face region is a front face, act S305 is performed; when it is detected that the face in the face region is not a front face, the process returns to the act S301, that is, a registered image of a next frame is obtained for processing, and the user is prompted to face a camera for registration.

Act S305, extracting face data to be registered from the face region by using a feature extraction module.

Act S306, comparing the face data to be registered with registered face data in a face database by using a comparison module, and determining whether the face data to be registered already exists in the face database according to a comparison result. When the face data to be registered already exists in the face database, the user is prompted to have already been registered, for example, a prompt content that the user has been registered is displayed on a display interface. When the face data to be registered does not exist in the face database, an ID is assigned to the face data to be registered, and the assigned ID and the face data to be registered are stored in the face database to achieve update of the face database.

In some examples, the comparison module may be used to calculate a similarity between the face data to be registered and each piece of registered face data in the face database. When there is a similarity that meets a threshold condition (for example, the similarity is greater than 0.7), it means that registered face data matches the face data to be registered already exists in the face database. When there is no similarity that meets the threshold condition, it means that there is no face data to be registered in the face database. However, this embodiment is not limited thereto.

Figure 4:
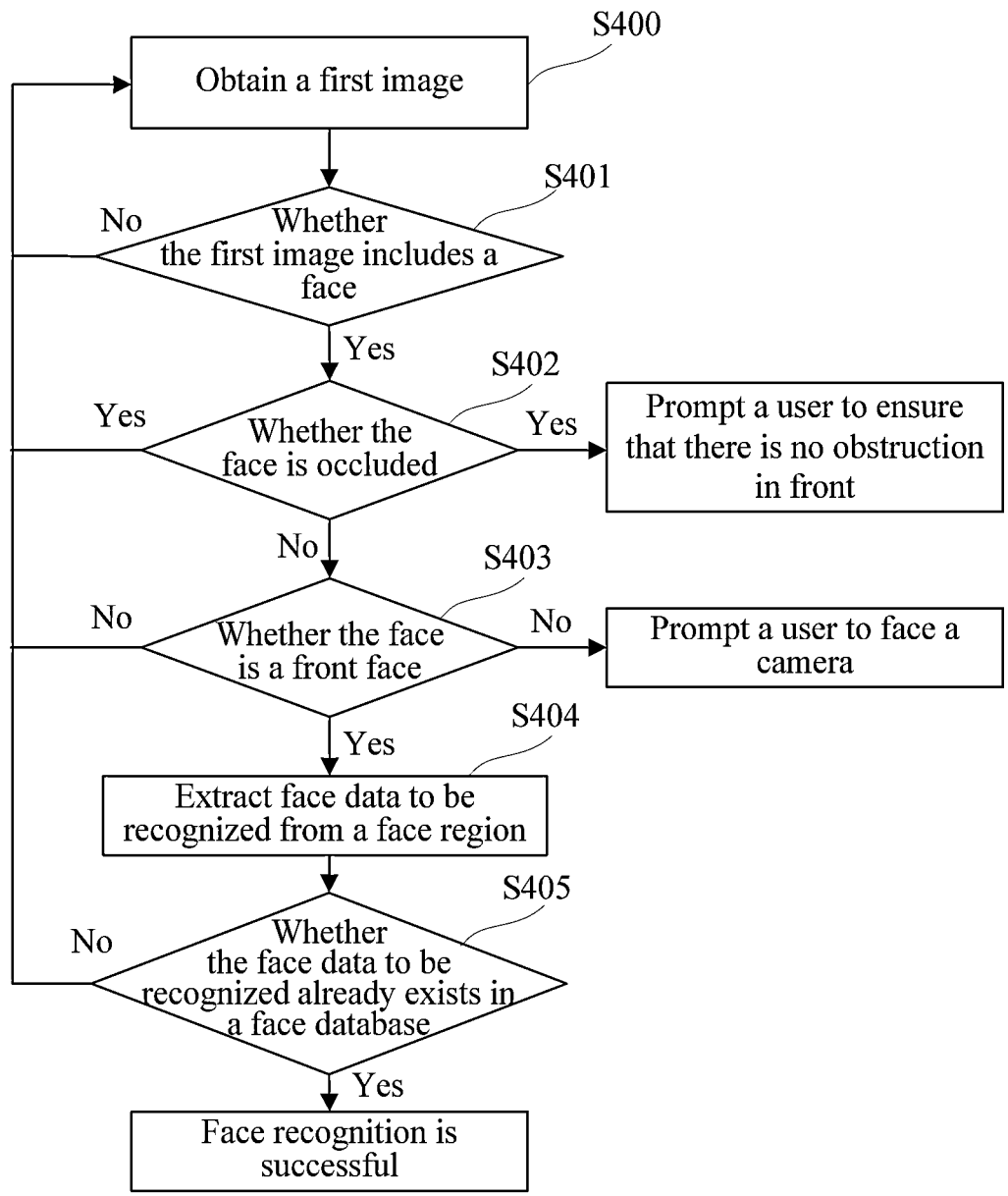
FIG. 4 is an exemplary flowchart of a face recognition process according to at least one embodiment of the present disclosure.

FIG. 4 is an exemplary flowchart of a face recognition process according to at least one embodiment of the present disclosure. In this example, a face recognition process of a first image is taken as an example. A face recognition process of a second image is similar to that of the first image, and will not be repeated here.

As shown in FIG. 4, after obtaining the first image through act S400, the face recognition process provided by this exemplary embodiment includes the following acts.

Act S401, detecting whether the first image includes a face by using a face detection model. In some examples, when a face is detected in the first image by using the face detection model, act S402 is performed; when no face is detected in the first image by the face detection model, the process returns to the act S400, for example, a first image of another frame obtained through an acquisition device in real time is obtained for processing.

Act S402, detecting whether a face in a face region is occluded by using an occlusion detection module. In some examples, when it is detected that the face in the face region is not occluded, act S403 is performed; when it is detected that the face in the face region is occluded, the process returns to the act S400, for example, a first image of another frame acquired through the acquisition device in real time is obtained for processing, and a user is prompted to ensure that there is no occlusive object in front.

Act S403, detecting whether the face in the face region is a front face by using the posture detection module. In some examples, when it is detected that the face in the face region is a front face, act S404 is performed; when it is detected that the face in the face region is not a front face, the process returns to the act S400, for example, a first image of another frame obtained through the acquisition device in real time is obtained for processing, and the user is prompted to face a camera.

Act S404, extracting face data to be recognized from the face region by using a feature extraction module.

Act S405, comparing the face data to be recognized with target face data in a face database by using a comparison module, and determining whether the face data to be recognized already exists in the face database according to a comparison result. In some examples, when there is target face data matching the face data to be recognized in the face database, a result that face recognition is successful is returned, that is, a first target face may be recognized from the first image; when there is no target face data matching the face data to be recognized in the face database, a result that face recognition fails is returned, and the process returns to the act S400, that is, a first image of another frame obtained through the acquisition device in real time is obtained for processing.

In some examples, the target face data in the face database may include all registered face data in the face database, or may include registered face data selected as an administrator in the face database. However, this embodiment is not limited thereto.

In some examples, the comparison module may be used to calculate a similarity between the face data to be recognized and each piece of target face data in the face database. When there is a similarity that meets a threshold condition (for example, the similarity is greater than 0.7), it means that the face data to be recognized already exists in the face database, and the first target face recognized in the first image is a target face whose similarity between the face database and the face data to be recognized meets the threshold condition. When there is no similarity that meets the threshold condition, it means that there is no face data to be recognized in the face database.

In some exemplary embodiments, the hand detection model may include a human body detection module, a human body segmentation module, an arm segmentation module, and a hand detection module. The human body detection module is configured to be used to detect whether the first image includes a human body. The human body segmentation module is configured to be used to segment the detected human body. The arm segmentation module is configured to be used to segment an arm region in a human body region. The hand detection module is configured to be used to detect a hand region from an arm region. However, this embodiment is not limited thereto.

Figure 5:
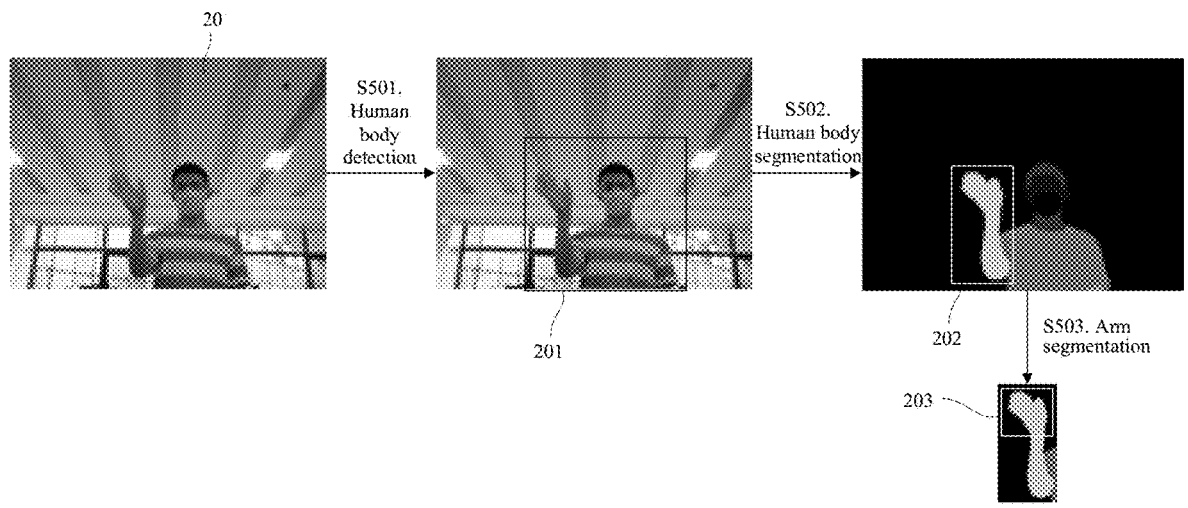
FIG. 5 is an exemplary flowchart of a gesture recognition process according to at least one embodiment of the present disclosure.

FIG. 5 is an exemplary flowchart of a hand recognition process according to at least one embodiment of the present disclosure. In this example, a gesture recognition process of a first image is taken as an example. A gesture recognition process of a second image is similar to that of the first image, and will not be repeated here.

As shown in FIG. 5, in some exemplary embodiments, the gesture recognition process may include the following acts.

Act S500, obtaining a first image. For example, a first image 20 is obtained through an acquisition device.

Act S501, detecting whether the first image includes a human body by using a human body detection module. In some examples, when it is detected that the first image 20 includes a human body, a human body region 201 where the human body is located is determined; when it is detected that the first image does not include a human body, it indicates that gesture recognition fails, and the process returns to the act S500, for example, a first image of another frame obtained through the acquisition device in real time is obtained for processing. In some examples, the human body region 201 may be a rectangular frame region. However, this embodiment is not limited thereto.

Act S502, segmenting the detected human body region 201 by using a human body segmentation module. In some examples, the human body in the human body region 201 may be divided into regions such as hair, face, neck, arms, and torso. For example, different regions may be marked with different colors or with different gray scales. However, this embodiment is not limited thereto.

Act S503, segmenting an arm region 202 from the human body region 201 by using an arm segmentation module. In some examples, the arm segmentation module may be used to detect whether the segmented human body includes an arm. When it is detected that the human body region does not include an arm, it indicates that gesture recognition fails, and the process returns to the act S500, for example, a first image of another frame obtained through the acquisition device in real time is obtained for processing. When it is detected that the human body region 201 includes an arm, an arm region 202 is segmented from the human body region 201, and act S504 is performed.

Act S504, detecting whether the arm region 202 includes a hand region by using a hand detection module. In some examples, when it is detected that the arm region 202 does not include a hand region, it indicates that gesture recognition fails, and the process returns to the act S500, for example, a first image of another frame obtained through the acquisition device in real time is obtained for processing. When it is detected that the arm region 202 includes a hand region 203, gesture recognition is performed on the hand region 203 by using a gesture recognition model to recognize a gesture in the hand region 203. For example, a gesture in the hand region 203 is a palm of one hand.

In this exemplary embodiment, by sequentially detecting the human body, the arm region, and the hand region in the first image, a situation that it is difficult to perform detection since the hand region occupies a small area in a picture may be avoided, thereby improving a success rate of gesture detection.

Figure 6:
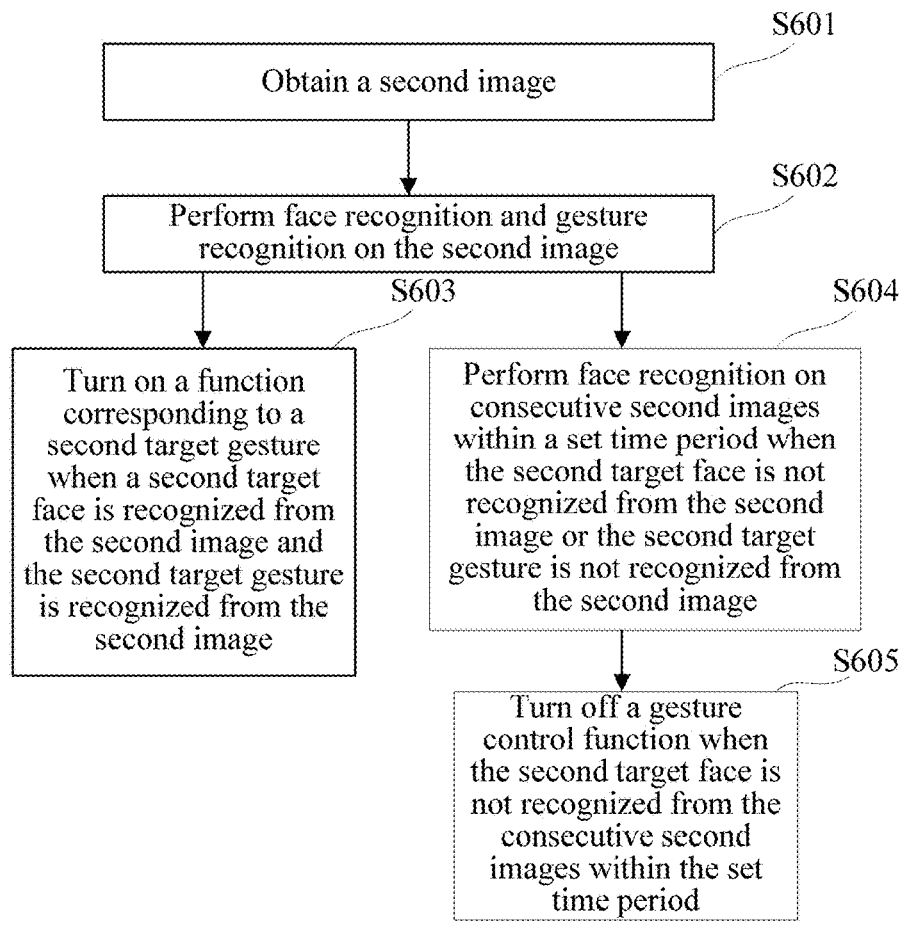
FIG. 6 is an exemplary flowchart of face recognition and gesture recognition after a gesture control function is turned on according to at least one embodiment of the present disclosure.

FIG. 6 is an exemplary flowchart of face recognition and gesture recognition after a gesture control function is turned on according to at least one embodiment of the present disclosure. As shown in FIG. 6, in some exemplary embodiments, the flowchart of face recognition and gesture recognition after the gesture control function is turned on includes the following acts.

Act S601, obtaining a second image. For example, a second image may be obtained through an acquisition device.

Act S602, performing face recognition and gesture recognition on the second image. A process of face recognition and gesture recognition for the second image may refer to the process of face recognition and gesture recognition for the first image, and will not be repeated here.

Act S603, turning on a function corresponding to a second target gesture when a second target face is recognized from the second image and a second target gesture is recognized from the second image. For example, the second target face may be a registered face in a face database.

Act S604, performing face recognition on second images of consecutive multiple frames within a set time period when the second target face is not recognized from the second image, or the second target gesture is not recognized from the second image. In this act, when the second target face is not recognized from the second image or the second target gesture is not recognized from the second image, a second image of another frame acquired through an acquisition device may be obtained to continue face recognition and gesture recognition until both face recognition and gesture recognition are successful. When face recognition of the second images of consecutive multiple frames fails within a set time period, act S605 may be performed.

Act S605, turning off the gesture control function when the second target face is not recognized from the second images of consecutive multiple frames within the set time period.

In this exemplary embodiment, after the gesture control function is turned on, whether to turn off the gesture control function is determined according to a face recognition result of second images of consecutive multiple frames. However, this embodiment is not limited thereto. For example, the gesture control function may be turned off in the act S604.

In some exemplary embodiments, after the gesture control function is turned on, the display interface of the electronic device may be controlled based on a face recognition result and a gesture recognition result of a second image.

Figure 7:
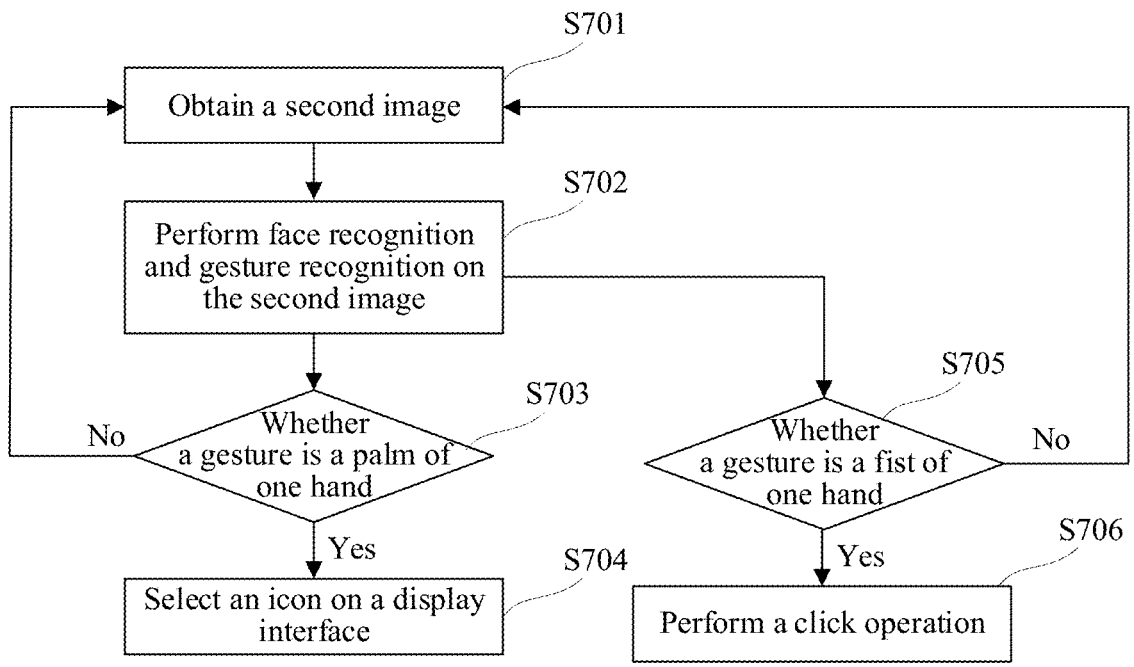
FIG. 7 is an exemplary flowchart of a gesture interaction process after a gesture control function is turned on according to at least one embodiment of the present disclosure.

FIG. 7 is an exemplary flowchart of a gesture interaction process after a gesture control function is turned on according to at least one embodiment of the present disclosure. In this example, a case where second target gestures recognized from a second image are a palm of one hand and a fist of one hand in sequence is taken as an example for description. As shown in FIG. 7, in some exemplary embodiments, a second image is obtained in act S701, and face recognition and gesture recognition are performed on the second image in act S702. In this example, a case where both face recognition and gesture recognition are successful is taken as an example for description. After recognizing a gesture in the second image, the gesture interaction process of this exemplary embodiment includes the following acts.

Act S703, determining whether the gesture recognized in the second image is a palm of one hand. In some examples, when the recognized gesture is not a palm of one hand, the process returns to the act S701, for example, a second image of another frame acquired through the acquisition device in real time is obtained for processing. When the recognized gesture is a palm of one hand, act S704 is performed.

Act S704, determining a mapping position of a palm in a hand region on a display interface, and selecting an icon corresponding to the mapping position, for example, illuminating an icon corresponding to the mapping position.

In some exemplary embodiments, a mapping relationship may be established between the second image and the display interface, and the mapping position of position coordinates of the hand region where the palm is located on the display interface may be determined according to the mapping relationship, for example, the mapping position of the hand region on the display interface may be a point position. When a region corresponding to the point position is a clickable range of an icon, an icon corresponding to the point position is illuminated; when the region corresponding to the point position is not within the clickable range of the icon, a cursor is displayed at the point position. For example, when the cursor is displayed at this point position, movement of the cursor on the display interface may be controlled by moving the palm. However, this embodiment is not limited thereto.

In some exemplary embodiments, after a gesture is recognized as a palm of one hand in a second image of a previous frame and after a gesture is recognized in a second image of a current frame, S705 may be performed, that is, whether a gesture recognized in a second image is a fist of one hand is determined. When the recognized gesture is not a fist of one hand, the process returns to the act S701, for example, a second image of another frame acquired through the acquisition device in real time is obtained for processing. When the recognized gesture is a fist of one hand, act S706 is performed, for example, a click operation is performed on a selected icon on the display interface, for example, a fist of one hand corresponds to a double-click operation, so as to activate a function corresponding to an icon. In some examples, the icon is a file icon, and a file content corresponding to the file icon may be controlled to be displayed on the display interface by clenching a fist of one hand; or, the icon is an application icon, and an application corresponding to the application icon may be controlled to be opened on the display interface by clenching a fist of one hand. However, this embodiment is not limited thereto.

In some exemplary embodiments, the correspondence between gestures and control operations may be preset. After both face recognition and gesture recognition of the second image are successful in the act S702, a matching control operation may be searched for in the preset correspondence according to the recognized gesture. When the matching control operation is found, the matching control operation may be performed. When no matching control operation is found, the process returns to the act S701, for example, a second image of another frame acquired through the acquisition device in real time is obtained for processing.

In this exemplary embodiment, through dual recognition results of face recognition and gesture recognition, a target user may control the electronic device in the air (i.e., remote and non-contact control), which may compensate for inconvenience and safety problems of using a hardware device such as a remote controller, and enhance user experience.

At least one embodiment of the present disclosure further provides an electronic device, which includes a display, a processor, and a memory. The display is connected to the processor and is adapted to provide a display interface, and the memory is adapted to store a computer program, and when the computer program is executed by the processor, the acts of the aforementioned control method are implemented.

Figure 8:
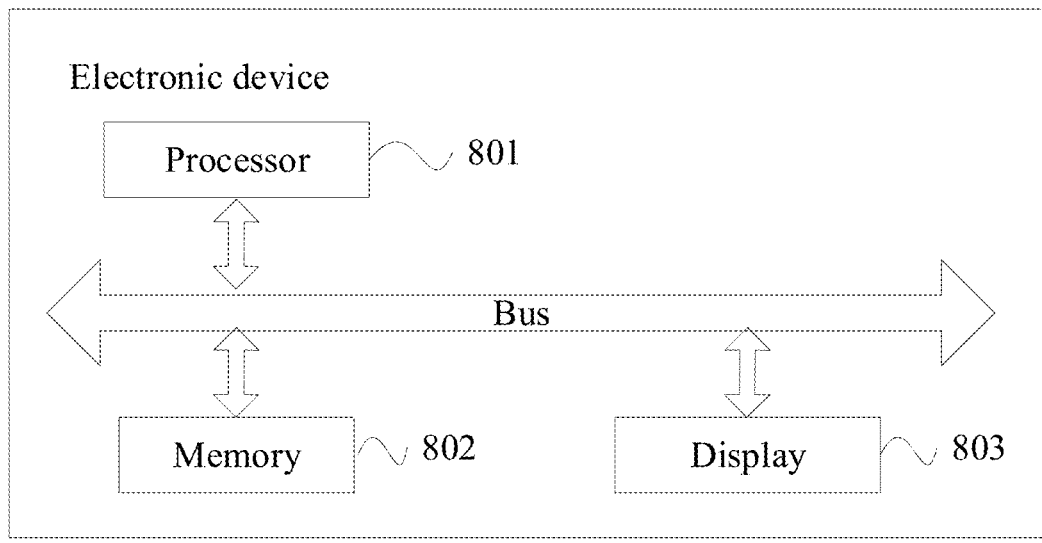
FIG. 8 is a schematic diagram of an electronic device according to at least one embodiment of the disclosure.

FIG. 8 is an exemplary diagram of an electronic device according to at least one embodiment of the disclosure. As shown in FIG. 8, the electronic device provided in this embodiment (such as a smart TV, an exhibition hall display screen) includes a processor 801, a memory 802, and a display 803. The processor 801, the memory 802, and the display 803 may be connected through a bus. The display 803 is adapted to provide a display interface; the memory 802 is adapted to store a computer program, when the computer program is executed by the processor 801, the acts of the control method according to the above embodiments are implemented.

In some examples, a structure of the electronic device shown in FIG. 8 does not constitute a limitation on the electronic device, and may include more or fewer components than shown in the figure, or combine some components, or provide different component arrangements.

In some examples, the processor 801 may include, but is not limited to, a processing apparatus such as a Microcontroller Unit (MCU) or a Field Programmable Gate Array (FPGA). The memory 802 may store software programs and modules of application software, such as program instructions or modules corresponding to the control method according to this embodiment. The processor 801 executes various functional applications and data processing, for example, implements the control method according to this embodiment, by running the software programs and modules stored in the memory 802. The memory 802 may include a high-speed random access memory, and may also include a non-volatile memory such as one or more magnetic storage apparatuses, flash memories, or other non-volatile solid-state memories. In some examples, the memory 802 may include memories remotely provided with respect to the processor 801, and these remote memories may be connected to the electronic device through a network. Examples of the above network include, but are not limited to, the Internet, the intranet, a local area network, a mobile communication network, and combinations thereof.

In some examples, the display 803 may be adapted to display information input by a user or information provided to the user. The display 803 may include a display panel, such as a liquid crystal display and an organic light emitting diode. However, this embodiment is not limited thereto.

In addition, at least one embodiment of the present disclosure further provides a computer-readable storage medium storing a computer program, when the computer program is executed by a processor, the acts of the above control method are implemented.

Those of ordinary skill in the art may understand that all or some of the acts in the method, functional modules or units in the system and apparatus disclosed above may be implemented as software, firmware, hardware, and an appropriate combination thereof. In a hardware implementation, a division between functional modules or units mentioned in the above description does not necessarily correspond to a division of physical components. For example, a physical component may have plurality of functions, or a function or an act may be performed by several physical components in cooperation. Some components or all components may be implemented as software executed by a processor such as a digital signal processor or a microprocessor, or implemented as hardware, or implemented as integrated circuits such as application specific integrated circuits. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage apparatus, or any other medium that may be used for storing desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information transmission medium.

The above shows and describes basic principles, main features, and advantages of the present disclosure. The present disclosure is not limited by the above embodiments. The above embodiments and descriptions in the specification only illustrate the principles of the present disclosure. Without departing from the spirit and scope of the present disclosure, there will be many changes and improvements in the present disclosure, and all of these changes and improvements fall within the protection scope of the present disclosure.

What is claimed is:

1. A control method, comprising:
obtaining, by a processor, a first image;
performing, by the processor, face recognition and gesture recognition on the first image;
turning on, by the processor, a gesture control function when a first target face is recognized from the first image and a first target gesture is recognized from the first image; and
returning, by the processor, to the act of obtaining a first image when the first target face is not recognized from the first image or the first target gesture is not recognized from the first image,
wherein performing, by the processor, gesture recognition on the first image comprises:
detecting whether the first image comprises a human body;
segmenting the human body to obtain a plurality of segmented regions when it is detected that the first image comprises the human body, and detecting whether segmented regions comprise an arm region;
detecting whether the arm region comprises a hand region when it is detected that the segmented regions comprise the arm region;
performing gesture recognition on the hand region when it is detected that the arm region comprises the hand region; returning a result that the first target gesture is recognized from the first image when a gesture in the hand region is recognized as the first target gesture; and
returning a result that the first target gesture is not recognized from the first image when it is detected that the first image does not comprise a human body, or that the segmented regions do not comprise an arm region, or that the arm region does not comprise a hand region, or that the gesture in the hand region is not the first target gesture.

2. The method according to claim 1, further comprising: providing, by the processor, first prompt information on a display interface when the first target face is recognized from the first image and the first target gesture is recognized from the first image, wherein the first prompt information is used for prompting a user that the gesture control function has been turned on.

3. The method according to claim 1, further comprising: providing, by the processor, second prompt information on a display interface when the first target face is recognized from the first image and the first target gesture is not recognized from the first image, wherein the second prompt information is used for prompting a user to adjust a gesture.

4. The method according to claim 1, further comprising: providing, by the processor, third prompt information on a display interface when the first target face is not recognized from the first image, wherein the third prompt information is used for prompting a user to adjust an angle of a face facing an acquisition device.

5. The method according to claim 4, further comprising: providing, by the processor, fourth prompt information on the display interface when the first target face is still not recognized from a first image of another frame re-acquired after the third prompt information is provided, wherein the fourth prompt information is used for prompting that the user has no operation authority.

6. The method according to claim 1, further comprising: obtaining, by the processor, a second image after the gesture control function is turned on, and performing, by the processor, face recognition and gesture recognition on the second image; and
turning on, by the processor, a function corresponding to a second target gesture when a second target face is recognized from the second image and the second target gesture is recognized from the second image.

7. The method according to claim 6, further comprising: returning, by the processor, to the act of obtaining the second image when the second target face is not recognized from the second image or the second target gesture is not recognized from the second image; and
turning off, by the processor, the gesture control function when the second target face is not recognized from second images of consecutive multiple frames within a set time period.

8. The method according to claim 1, wherein the performing, by the processor, face recognition and gesture recognition on the first image comprises:
performing face recognition on the first image; and
performing gesture recognition on the first image after the first target face is recognized from the first image.

9. The method according to claim 1, wherein the performing, by the processor, face recognition on the first image comprises:
detecting whether the first image comprises a face;
detecting whether the face in the first image is occluded when it is detected that the first image comprises the face;
detecting whether the face in the first image is a front face when it is detected that the face in the first image is not occluded;
performing feature extraction on the first image to obtain face data to be recognized when it is detected that the face in the first image is the front face;
comparing the face data to be recognized with target face data in a face database;
returning a result that the first target face is recognized from the first image when there is target face data matched with the face data to be recognized in the face database; and
returning a result that the first target face is not recognized from the first image when it is detected that the first image does not comprise a face, or that the face in the first image is occluded, or that the face in the first image is not a front face, or that there is no target face data matched with the face data to be recognized in the face database.

10. The method according to claim 9, further comprising: registering, by the processor, a target face in the face database;
wherein the registering, by the processor, the target face in the face database comprises:
obtaining a registered image;
detecting whether the registered image comprises a face;
returning to the act of obtaining the registered image when it is detected that the registered image does not comprise a face;
detecting whether the face in the registered image is occluded when it is detected that the registered image comprises the face;
returning to the act of obtaining the registered image when it is detected that the face in the registered image is occluded;
detecting whether the face in the registered image is a front face when it is detected that the face in the registered image is not occluded;
returning to the act of obtaining the registered image when it is detected that the face in the registered image is not a front face;
performing feature extraction on the registered image to obtain face data to be registered when it is detected that the face in the registered image is a front face;
comparing the face data to be registered with registered face data in the face database;
providing fifth prompt information on a display interface when there is registered face data matched with the face data to be registered in the face database, wherein the fifth prompt information is used for prompting that a user is already registered; and
assigning an identifier to the face data to be registered when there is no registered face data matched with the face data to be registered in the face database, and saving the face data to be registered in the face database.

11. The method according to claim 1, wherein the first target gesture comprises an OK gesture.

12. The method according to claim 6, wherein the turning on, by the processor, the function corresponding to the second target gesture comprises:
determining a mapping position of a palm of one hand on a display interface when the second target gesture is the palm of one hand, and selecting an icon corresponding to the mapping position; and
turning on a function indicated by the icon corresponding to the mapping position after the palm of one hand is detected and when it is detected that the second target gesture is a fist of one hand.

13. An electronic device, comprising the processor of claim 1, a memory, and a display; the display is connected to the processor and is adapted to provide a display interface; the memory is adapted to store a computer program, and when the computer program is executed by the processor, acts of the control method according to claim 1 are implemented.

14. A non-transitory computer-readable storage medium, storing a computer program, wherein when the computer program is executed by the processor of claim 1, acts of the control method according to claim 1 are implemented.

15. The method according to claim 2, further comprising: obtaining, by the processor, a second image after the gesture control function is turned on, and performing, by the processor, face recognition and gesture recognition on the second image; and turning on, by the processor, a function corresponding to a second target gesture when a second target face is recognized from the second image and the second target gesture is recognized from the second image.

16. The method according to claim 15, further comprising: returning, by the processor, to the act of obtaining a second image when the second target face is not recognized from the second image or the second target gesture is not recognized from the second image; and turning off, by the processor, the gesture control function when the second target face is not recognized from second images of consecutive multiple frames within a set time period.

17. The method according to claim 8, wherein the performing, by the processor, face recognition on the first image comprises:

detecting whether the first image comprises a face;

detecting whether the face in the first image is occluded when it is detected that the first image comprises the face;

detecting whether the face in the first image is a front face when it is detected that the face in the first image is not occluded;

performing feature extraction on the first image to obtain face data to be recognized when it is detected that the face in the first image is the front face;

comparing the face data to be recognized with target face data in a face database;

returning a result that the first target face is recognized from the first image when there is target face data matched with the face data to be recognized in the face database; and returning a result that the first target face is not recognized from the first image when it is detected that the first image does not comprise a face, or that the face in the first image is occluded, or that the face in the first image is not a front face, or that there is no target face data matched with the face data to be recognized in the face database.

18. The method according to claim 8, wherein the performing, by the processor, gesture recognition on the first image comprises:

detecting whether the first image comprises a human body;

segmenting the human body to obtain a plurality of segmented regions when it is detected that the first image comprises the human body, and detecting whether segmented regions comprise an arm region;

detecting whether the arm region comprises a hand region when it is detected that the segmented regions comprise the arm region;

performing gesture recognition on the hand region when it is detected that the arm region comprises the hand region; returning a result that the first target gesture is recognized from the first image when a gesture in the hand region is recognized as the first target gesture; and returning a result that the first target gesture is not recognized from the first image when it is detected that the first image does not comprise a human body, or that the segmented regions do not comprise an arm region, or that the arm region does not comprise a hand region, or that the gesture in the hand region is not the first target gesture.

19. The method according to claim 7, wherein the turning on, by the processor, the function corresponding to the second target gesture comprises:

determining a mapping position of a palm of one hand on a display interface when the second target gesture is the palm of one hand, and selecting an icon corresponding to the mapping position; and turning on a function indicated by the icon corresponding to the mapping position after the palm of one hand is detected and when it is detected that the second target gesture is a fist of one hand.

* * * * *